United States Patent
Aktas (10) Patent No.: US 8,366,197 B2
(45) Date of Patent: Feb. 5, 2013

(54) ANGLE ADJUSTMENT APPARATUS FOR VEHICLE SEAT

(75) Inventor: Macit Aktas, Windsor (CA)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 357 days.

(21) Appl. No.: 12/815,628

(22) Filed: Jun. 15, 2010

(65) Prior Publication Data
US 2011/0304188 A1 Dec. 15, 2011

(51) Int. Cl.
*B60N 2/235* (2006.01)
(52) U.S. Cl. .................................... 297/367 R
(58) Field of Classification Search .............. 297/367 R
See application file for complete search history.

(56) References Cited

U.S. PATENT DOCUMENTS

| | | | |
|---|---|---|---|
| 4,087,885 A * | 5/1978 | Gillentine | 297/367 R X |
| 4,997,223 A * | 3/1991 | Croft | 297/367 R |
| 5,516,198 A | 5/1996 | Yokoyama | |
| 5,685,610 A * | 11/1997 | Minai | 297/367 R X |
| 5,702,156 A * | 12/1997 | Takagi | 297/367 R |
| 6,230,863 B1 * | 5/2001 | Ovens | 297/367 R X |
| 6,398,308 B1 * | 6/2002 | Becker et al. | 297/367 R |
| 7,322,654 B2 * | 1/2008 | Kawashima | 297/362 |
| 7,384,101 B2 * | 6/2008 | Kawashima et al. | 297/362 |
| 7,513,572 B2 * | 4/2009 | Kawashima | 297/362 |
| 7,950,741 B2 * | 5/2011 | Mitsuhashi | 297/367 R X |
| 8,231,176 B2 * | 7/2012 | Mitsuhashi | 297/367 R |
| 2009/0250990 A1 | 10/2009 | Endo et al. | |
| 2009/0289488 A1 | 11/2009 | Mitsuhashi | |
| 2010/0026072 A1 | 2/2010 | Uramichi et al. | |
| 2010/0150645 A1 | 6/2010 | Endo et al. | |

OTHER PUBLICATIONS

Atsutaka Mitsuhashi, "Rotation Prevention Devices of Vehicle Seat", U.S. Appl. No. 12/672,305, filed Feb. 2010, PP.
Yoshiyuki Kumazaki et al., "Vehicle Seat Reclining Device", U.S. Appl. No. 12/739,036, filed Apr. 2010, PP.

* cited by examiner

*Primary Examiner* — Rodney B White
(74) *Attorney, Agent, or Firm* — Greenblum & Bernstein, P.L.C.

(57) ABSTRACT

An angle adjustment apparatus has a first member, a second member, a lock member, and a movement mechanism axially moving the lock member. The first member has first teeth on a surface facing the lock member. The lock member has second teeth and a rotation regulation portion, the second teeth being engaged with the first teeth, the rotation regulation portion being engaged with the second member. The movement mechanism has an input member and a drive member, the input member being regulated from being axially moved relative to the first member or the second member, the drive member being regulated from being axially moved relative to the lock member. A first engagement portions is provided to the external peripheral surface of the input member. A second engagement portion engaged with the first engagement portion is provided to the drive member.

9 Claims, 10 Drawing Sheets

ANGLE ADJUSTMENT APPARATUS FOR VEHICLE SEAT

BACKGROUND OF THE INVENTION

1. Field of the Invention

The present invention relates to an angle adjustment apparatus for a vehicle seat, the apparatus angle-adjustably connecting a first seat member and a second seat member of the vehicle seat.

2. Description of Related Art

An angle adjustment apparatus is a recliner that angle-adjustably connects a seat back to a seat cushion, for example (refer to the specification of U.S. Pat. No. 5,516,198). A conventional recliner has an arm plate provided to a seat back, a base plate provided to a seat cushion, a slider axially movably provided between the arm plate and the base plate, and a movement mechanism axially moving the slider relative to the arm plate.

The arm plate has teeth on a surface facing the slider. The slider has a tubular main body and a flange provided to an end portion of the main body. The flange is provided with teeth on a surface facing the arm plate, the teeth being engaged with the teeth of the arm plate. The movement mechanism has a tubular slider guide to which the slider main body is inserted, and a lever connected to the slider guide. The slider guide is provided with a guide hole extending obliquely in axial and circumferential directions. A pin is inserted to the guide hole, and an end portion of the pin is attached to the slider.

Thus, when the slider guide is axially rotated by the lever, the pin is axially moved along the guide hole of the slider guide. The slider is axially moved concurrently with the pin, and then the teeth of the slider are disengaged from the teeth provided to the arm plate. Thereby, the arm plate is axially rotatable relative to the base plate. When the lever is returned to an original position, the teeth provided to the slider and the teeth provided to the arm plate are engaged again. Thus, the arm plate is regulated from being rotated relative to the base plate.

The lever is provided, however, to an external peripheral surface of the slider guide, and the slider is provided to an internal peripheral side of the slider guide. The slider has the end portion axially extending more than the slider guide, and the flange projecting radially externally from the end portion more than the slider guide. The flange is provided with the teeth. Thus, an input torque is transferred from the radially external side to internal side, when the torque is transferred from the lever to the slider. The teeth of the slider are positioned radially externally in order to obtain the torque. Thus, the conventional angle adjustment apparatus has a complex configuration having radially crossing members.

SUMMARY OF THE INVENTION

In view of the above, the present invention provides an angle adjustment apparatus for a vehicle seat. A first advantage of the embodiments of the present invention provides an angle adjustment apparatus for a vehicle seat including a first member attached to a first seat member; a second member attached to a second seat member and rotatably mounted to the first member; a lock member axially movably provided between the first member and the second member; and a movement mechanism axially moving the lock member relative to the first member. The first member has first teeth on a surface facing the lock member. The lock member has second teeth and a rotation regulation portion, the second teeth being engaged with the first teeth at a position radially external to the rotation center of the first member and the second member, the rotation regulation portion being engaged with the second member and regulating the lock member from being axially rotated relative to the second member. The movement mechanism has an input member and a drive member, the input member being provided at the rotation center of the first member and the second member, and being regulated from being axially moved relative to one of the first member and the second member, the drive member being provided between an external peripheral surface of the input member and the lock member, and being regulated from being axially moved relative to the lock member. A first engagement portion is provided to the external peripheral surface of the input member. A second engagement portion engaged with the first engagement portion is provided to the drive member. At least one of the first engagement portion and the second engagement portion is provided extending axially and circumferentially.

Accordingly, when the input member is axially rotated, the drive member is axially moved by the first engagement portion and the second engagement portion, relative to the input member. The drive member is positioned radially external to the input member. The lock member, which is positioned radially external to the drive member, is axially moved by the drive member. Thus, an input torque is transferred from the radial center to the external side. The lock member has the second teeth engaged with the first teeth of the first member at a position radially external to the drive member. Thus, the lock member and the first member are mutually engaged with a relatively large torque. Thereby, the members are radially aligned without having radially crossing portions, and the lock member and the first member are engaged with a large torque. Accordingly, the angle adjustment apparatus can be constructed simply, compared to a conventional configuration.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
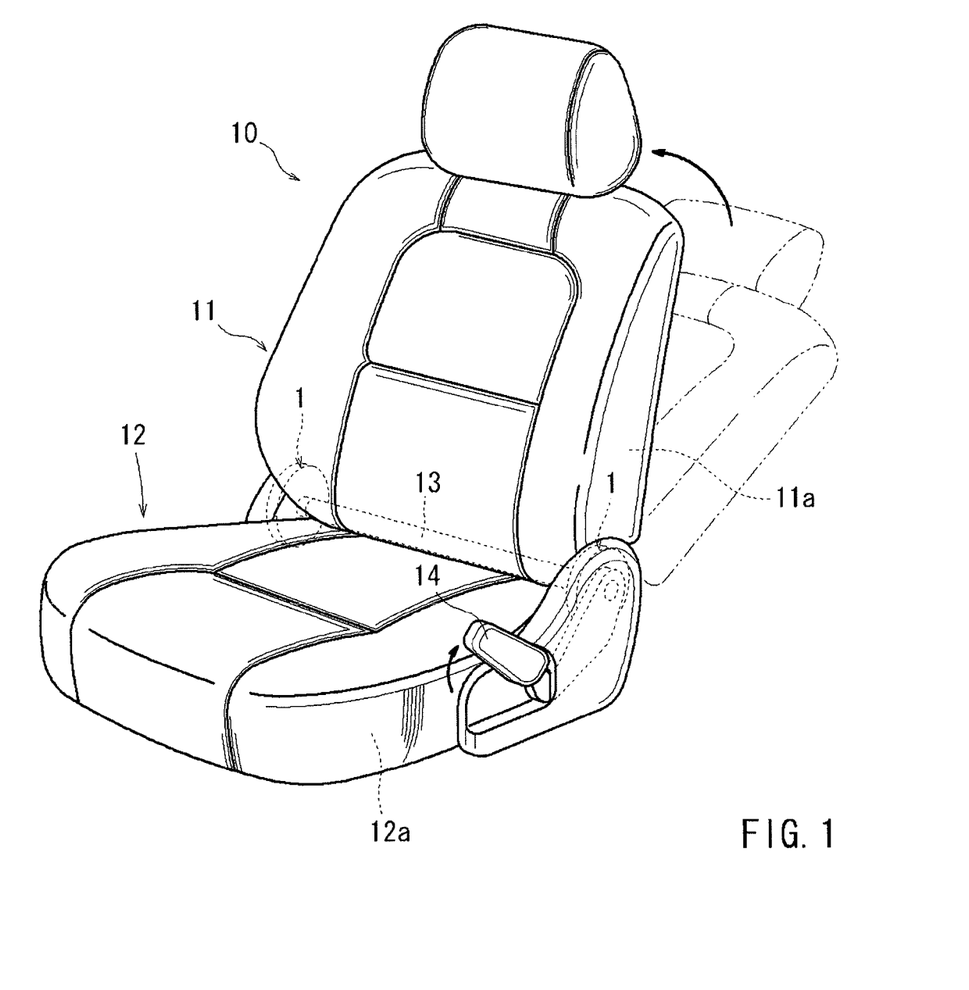
FIG. 1 is a perspective view of a vehicle seat.

An embodiment of the present invention is explained with reference to FIGS. 1 to 6. As shown in FIG. 1, a vehicle seat 10 is a seat mounted to a vehicle and the like. The vehicle seat 10 has a seat back 11, a seat cushion 12, and a pair of angle adjustment apparatuses (recliners) 1. The angle adjustment apparatuses 1 angle-adjustably connect the seat back 11 and the seat cushion 12. The seat back 11 has a first seat member (back frame) 11a extending along a side surface of the seat back 11. The seat cushion 12 has a second seat member (cushion frame) 12a extending along a side surface of the seat cushion 12.

Figure 2:
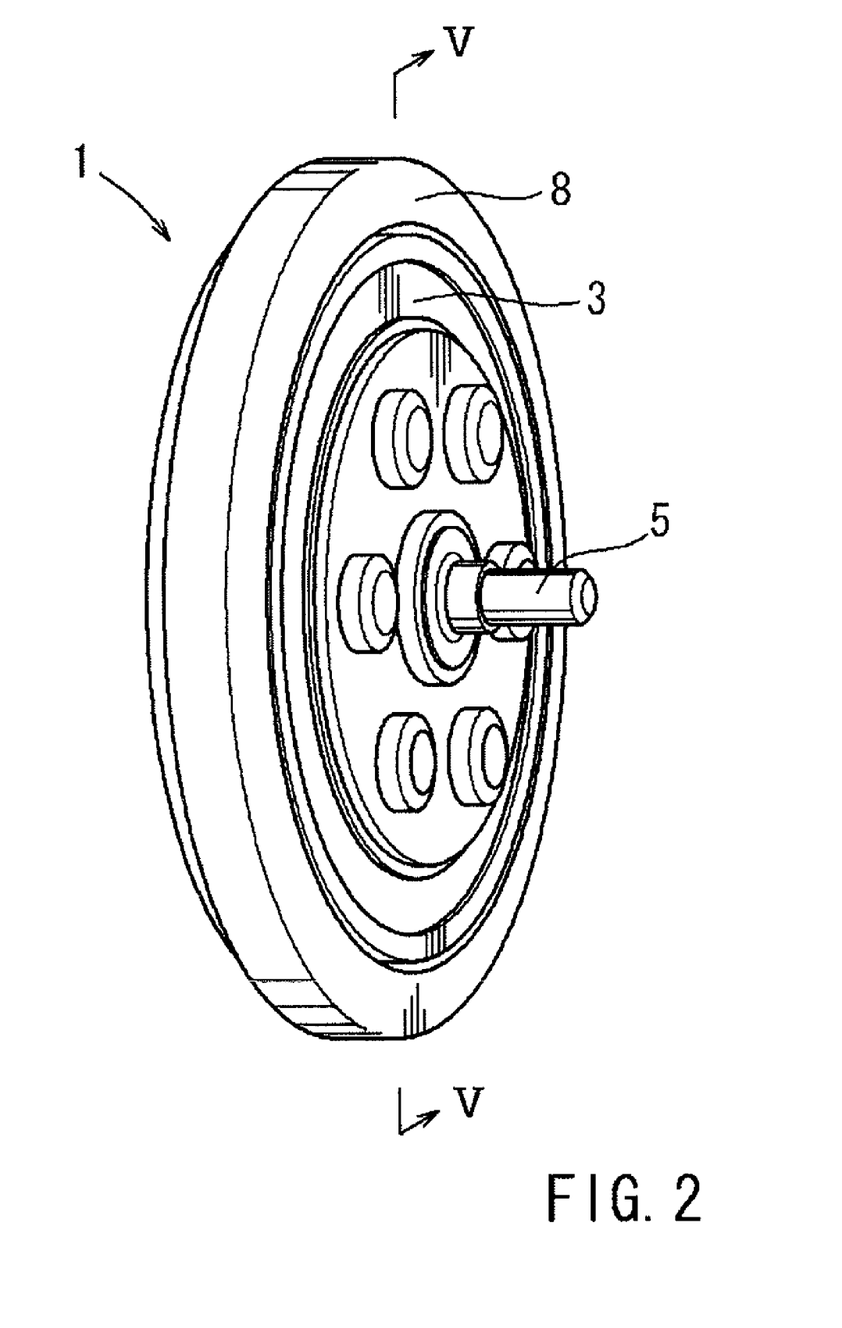
FIG. 2 is a perspective view of an angle adjustment apparatus.
Figure 3:
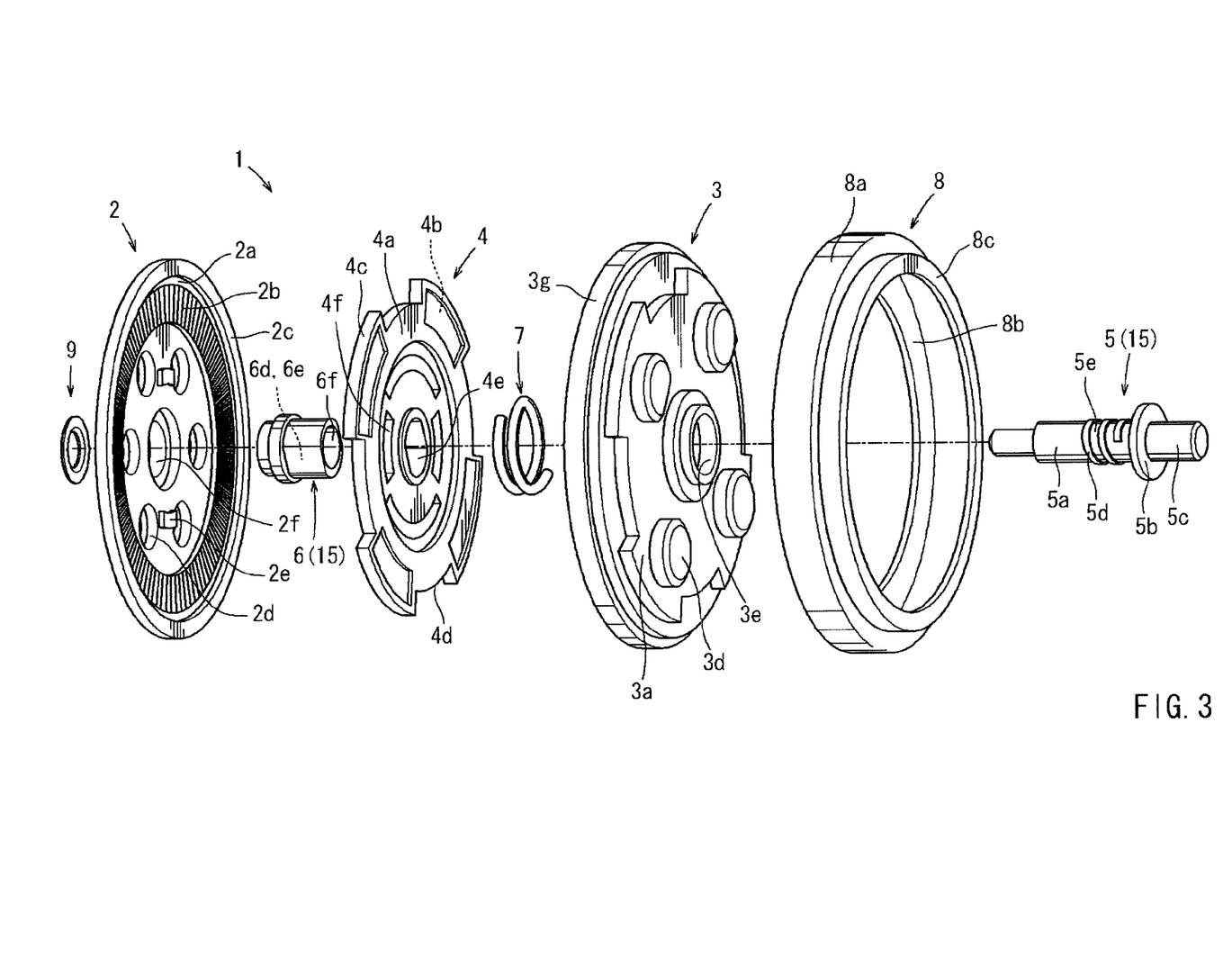
FIG. 3 is an exploded perspective view of the angle adjustment apparatus.

As shown in FIGS. 1 to 3, the angle adjustment apparatus 1 has a first member (ratchet) 2, a second member (guide member) 3, and a lock member 4. The first member 2 is integrally provided with a main body 2a and a flange 2c, the main body 2a having a circular plate shape, the flange 2c being provided along an external periphery of the main body 2a. The main body 2a is provided with teeth 2b, an attachment portion 2d, and a projection pin 2e. The teeth 2b are provided to a surface facing the lock member 4. The plurality of teeth 2b are provided having an equal distance in between, along an entire circumference of an external portion of an internal surface of the main body 2a.

Figure 5:
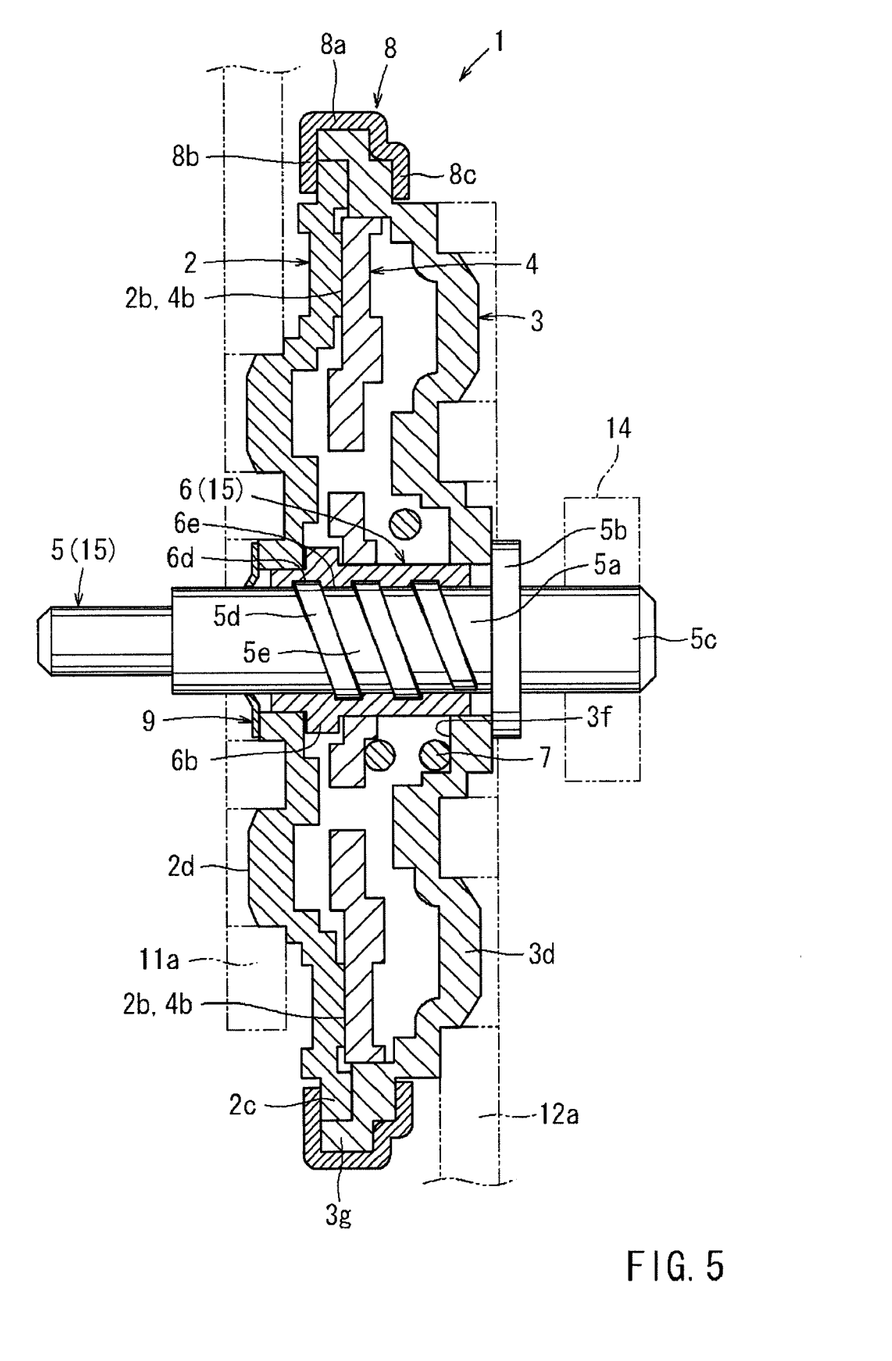
FIG. 5 is a cross-sectional fragmentary view of the angle adjustment apparatus in a locked state taken along line V-V of FIG. 2.

The attachment portion 2d is provided projecting in a direction away from the lock member 4, as shown in FIG. 5, and is attached to the first seat member 11a by welding and the like. The projection pin 2e is provided projecting toward the lock member 4, as shown in FIG. 3, and is inserted to an elongated groove 4f provided to the lock member 4. A hole 2f is provided at the center of the main body 2a, the hole 2f penetrating the main body 2a in a thickness direction. The flange 2c has a ring shape and is rotatably held by the second member 3.

Figure 4:
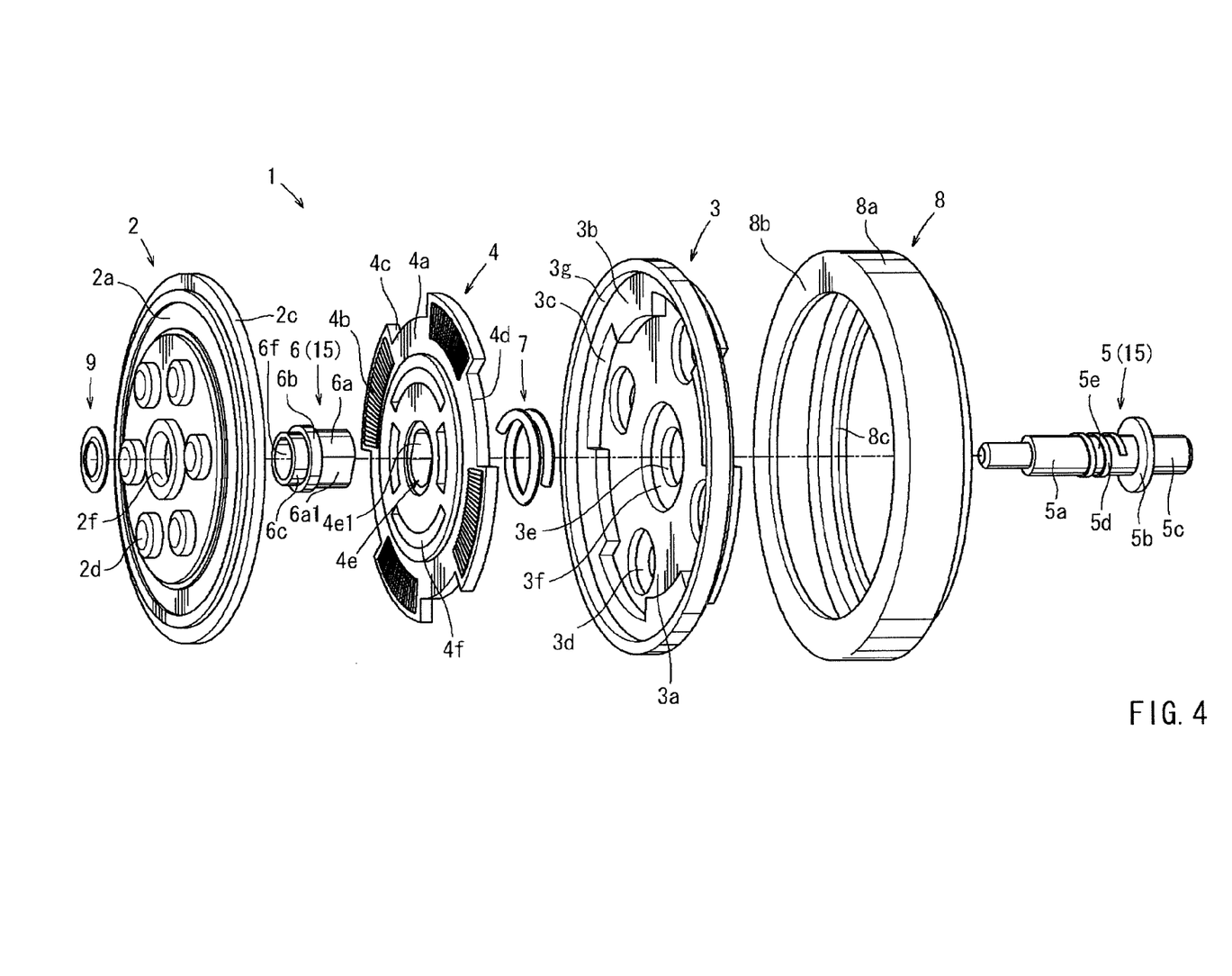
FIG. 4 is an exploded perspective view of the angle adjustment apparatus.

The second member 3 is integrally provided with a main body 3a and a flange 3g, as shown in FIGS. 4 and 5, the main body 3a having a circular plate shape, the flange 3g being provided along an external periphery of the main body 3a. The main body 3a is provided with a projection 3d and an attachment recess 3f. The projection 3d is provided projecting in a direction away from the lock member 4, and is attached to the second seat member 12a by welding and the like. The attachment recess 3f is provided to a surface facing the lock member 4. A first end portion of a biasing member 7 is provided to the attachment recess 3f. A hole 3e is provided at the center of the main body 3a, the hole 3e penetrating the main body 3a in a thickness direction.

The flange 3g of the second member 3 has a ring shape, as shown in FIGS. 4 and 5. The first member 2 is rotatably provided to an internal periphery of the flange 3g. Rotation regulation portions 3b are provided to an area of an internal peripheral surface in the axial direction of the flange 3g. The plurality of rotation regulation portions 3b are provided having a predetermined distance in between in the circumferential direction, and projecting from the flange 3g toward the center of the main body 3a. Recesses 3c are provided between the rotation regulation portions 3b. The rotation regulation portions 3b and the recesses 3c are engaged with the lock member 4.

The lock member 4 is integrally provided with a main body 4a having a circular plate shape and with a plurality of rotation regulation portions 4c, as shown in FIGS. 3 and 4. The plurality of rotation regulation portions 4c are provided along an external periphery of the main body 4a at a predetermined distance, and projecting radially externally from the main body 4a. The rotation regulation portions 4c are engaged with the recesses 3c of the second member 3, and regulate the lock member 4a from being rotated relative to the second member 3. Recesses 4d are provided between the rotation regulation portions 4c, and are engaged with the rotation regulation portions 3b of the second member 3.

The lock member 4 has a plurality of teeth 4b, as shown in FIGS. 4 and 5. The respective teeth 4b are provided radially extending in the main body 4a and the rotation regulation portions 4c. The plurality of teeth 4b are provided having a predetermined distance in between in the circumferential direction in a plurality of areas, along an external periphery of the lock member 4. The teeth 4b are provided to a surface of the lock member 4 facing the first member 2, and are engaged with the teeth 2b of the first member 2. A hole 4e is provided at the center of the main body 4a, the hole 4e penetrating the main body 4a in a thickness direction. A rotation regulation portion 4e1 is provided to the hole 4e, and thus the hole 4e has a non-circular shape.

The lock member 4 is provided with the elongated groove 4f having an arc shape, as shown in FIGS. 3 and 4. The projection pin 2e of the first member 2 is inserted to the elongated groove 4f. When the projection pin 2e is inserted to the elongated groove 4f, the teeth 4b of the lock member 4 are engaged with the teeth 2b of the first member 2. When the projection pin 2e is not inserted to the elongated groove 4f (free zone state), the projection pin 2e is contacted with the main body 4a of the lock member 4, and thereby the teeth 4b and the teeth 2b are prevented from being engaged.

The biasing member 7 is provided between the lock member 4 and the second member 3, as shown in FIGS. 3 and 4. The biasing member 7 is, for instance, a coil spring. The first end portion of the biasing member 7 is provided to the attachment recess 3f of the second member 3, and a second end portion of the biasing member 7 is provided contacting the lock member 4. The biasing member 7 is elastically deformed, and thereby the lock member 4 is biased against the first member 2.

As shown in FIGS. 4 and 5, the angle adjustment apparatus 1 has a mount member 8, which regulates the first member 2 and the second member 3 from being axially disengaged. The mount member 8 is integrally provided with a ring main body 8a, a first overhang 8b, and a second overhang 8c. The ring main body 8a has a cylindrical shape, and covers an external peripheral surface of the first member 2 and an external peripheral surface of the second member 3.

The first overhang 8b has an annular shape, and is provided to an internal peripheral side of a first end portion of the ring main body 8a, as shown in FIGS. 4 and 5. The first overhang 8b is provided axially adjacent to the first member 2, and regulates the first member 2 from being moved in a direction disengaging from the second member 3. The second overhang 8c has an annular shape, and is provided to an internal peripheral side of a second end portion of the ring main body 8a. The second overhang 8c is provided axially adjacent to the second member 3, and regulates the second member 3 from being moved in a direction disengaging from the first member 2.

As shown in FIGS. 3 and 4, the angle adjustment apparatus 1 has a movement mechanism 15, which axially moves the lock member 4. The movement mechanism 15 has an input member 5 and a drive member 6. The drive member 6 is integrally provided with a main body 6a, an end portion 6c, and a projection (flange) 6b. The main body 6a has a tubular shape. An external peripheral surface of the main body 6a is non-circular, since the surface has a rotation regulation surface 6a1. When the main body 6a is inserted to the hole 4e of the lock member 4, the rotation regulation surface 6a1 is provided opposite to the rotation regulation portion 4e1. Thereby, the drive member 6 is regulated from being axially rotated relative to the lock member 4, and is axially movably attached.

An engagement portion 6d, 6e (female thread) is provided to an internal peripheral surface of the main body 6a, as shown in FIG. 5. The engagement portion 6d, 6e includes a groove-shaped spiral 6d (thread) extending axially and circumferentially and a projecting spiral 6e (thread) extending axially and circumferentially.

The end portion 6c of the drive member 6 has a cylindrical shape, as shown in FIGS. 3 and 4, and is axially rotatably provided to the hole 2f of the first member 2. The projection 6b is provided projecting radially externally from the main body 6a, and projecting between the first member 2 and the lock member 4. Thereby, the projection 6b regulates the drive member 6 from being axially moved relative to the first member 2 and the lock member 4.

The input member 5 is integrally provided with a main body 5a, a projection 5c, and a flange 5b, as shown in FIGS. 3 and 4. The main body 5a has a cylindrical shape, and has an engagement portion 5d, 5e (male thread) on an external peripheral surface. The engagement portion 5d, 5e includes a projecting spiral 5d (thread) and a groove-shaped spiral 5e (thread), the projecting spiral 5d projecting radially from the main body 5a and extending axially and circumferentially, the groove-shaped spiral 5e being provided between the projecting spiral 5d and extending axially and circumferentially.

The projecting spiral 5d is engaged with the groove-shaped spiral 6d of the drive member 6, as shown in FIG. 5. The groove-shaped spiral 5e is engaged with the projecting spiral 6e of the drive member 6. The main body 5a is inserted to the hole 3e of the second member 3 and the hole 6f of the drive member 6, as shown in FIGS. 4 and 5. The main body 5a passes through the drive member 6, and thereby the main body 5a passes through the hole 4e of the lock member 4 and the hole 2f of the first member 2.

The flange 5b of the input member 5 is provided projecting radially externally from the main body 5a to an external side surface of the second member 3, as shown in FIGS. 4 and 5. An attachment member 9 is mounted to an end portion of the main body 5a. The attachment member 9 has a ring shape. An internal peripheral portion thereof is mounted to the main body 5a, and an external peripheral portion thereof is projected to the first member 2. Thus, the input member 5 is regulated from being axially moved by the attachment member 9 and the flange 5b.

The projection 5c of the input member 5 is provided axially extending from the main body 5a and projecting externally through the second member 3, as shown in FIGS. 4 and 5. A lever 14 is attached to the projection 5c. The lever 14 is provided extending forward from the angle adjustment apparatus 1, as shown in FIG. 1. Lifting a front end portion of the lever 14 changes the angle adjustment apparatus 1 from a locked state of FIG. 5 to an unlocked state of FIG. 6.

When the angle adjustment apparatus 1 is in the locked state, the biasing member 7 biases the lock member 4 against the first member 2, as shown in FIG. 5, and thus the teeth 4b of the lock member 4 are engaged with the teeth 2b of the first member 2. The lock member 4 is regulated from being rotated relative to the second member 3. Thus, the first member 2 and the second member 3 are regulated from being rotated, by the lock member 4. Thereby, the first seat member 11a and the second seat member 12a are regulated from being rotated, by the angle adjustment apparatus 1.

Figure 6:
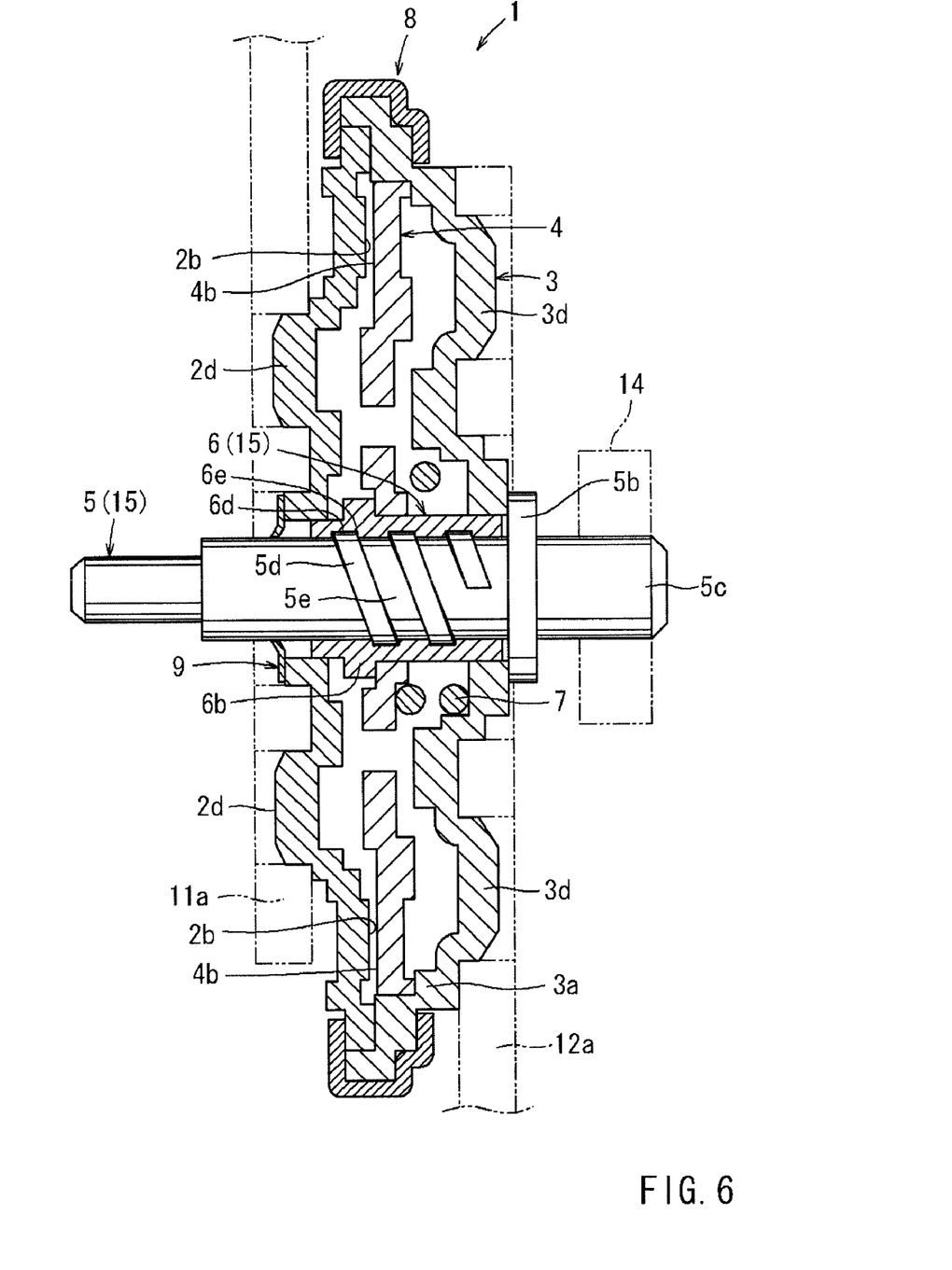
FIG. 6 is a cross-sectional fragmentary view of the angle adjustment apparatus in an unlocked state taken along line V-V of FIG. 2.

In order to unlock the angle adjustment apparatus 1 in the locked state, the end portion of the lever is lifted upward, as shown in FIG. 1. The lever 14 is then axially rotated concurrently with the input member 5, as shown in FIGS. 5 and 6. Meanwhile, the drive member 6 is regulated from being rotated, by the lock member 4 and the first member 2. When the input member 5 is axially rotated, the engagement portion 5d, 5e axially pushes the engagement portion 6d, 6e of the drive member 6. Thereby, the drive member 6 is axially moved relative to the input member 5.

The drive member 6 is moved from the first member 2 toward the second member 3, as shown in FIG. 6. The projection 6b of the drive member 6 pushes the lock member 4 toward the second member 3. The teeth 4b of the lock member 4 are disengaged from the teeth 2b of the first member 2, and then the first member 2 is axially rotatable relative to the lock member 4 and the second member 3. Thereby, the first seat member 11a is rotatable relative to the second seat member 12a, and thus the seat back 11 can be angle-adjusted relative to the seat cushion 12, as shown in FIG. 1.

When the force exerted on the lever 14 is released, the biasing member 7 pushes the lock member 4 toward the first member 2, as shown in FIG. 5. The angle adjustment apparatus 1 is then returned from the unlocked state to the locked state. When the seat back 11 is tilted forward more than a predetermined angle, however, the angle adjustment apparatus 1 enters the free zone state. In the free zone state, the projection pin 2e is not inserted to the elongated groove 4f, and is contacted with the main body 4a of the lock member 4, as shown in FIG. 3. Thus, the lock member 4 and the first member 2 are not locked. Accordingly, even when the force exerted on the lever 14 is released, the seat back 11 is rotated from the tilted angle more forward than the predetermined angle to an angle aligned up with the seat cushion 12.

As described above, the angle adjustment apparatus 1 has the lock member 4 and the movement mechanism 15, as shown in FIG. 3. The lock member 4 has the second teeth 4b, which are engaged with the first teeth 2b at a position radially external to the rotation center of the first member 2 and the second member 3. The movement mechanism 15 has the input member 5 and the drive member 6, the input member 5 being positioned at the rotation center of the first member 2 and the second member 3 and being regulated from being axially moved relative to the first member 2 and the second member 3, the drive member 6 being provided between the external peripheral surface of the input member 5 and the lock member 4 and being regulated from being axially moved relative to the lock member 4. The first engagement portion 5d, 5e is provided to the external peripheral surface of the input member 5. The second engagement portion 6d, 6e, which is engaged with the first engagement portion 5d, 5e, is provided to the drive member 6. The first engagement portion 5d, 5e, and the second engagement portion 6d, 6e are provided extending axially and circumferentially.

Thus, when the input member 5 is axially rotated, the drive member 6 is axially moved relative to the input member 5, by the first engagement portion 5d, 5e, and the second engagement portion 6d, 6e. The drive member 6 is positioned radially external to the input member 5. The lock member 4, which is positioned radially external to the drive member 6, is axially moved by the drive member 6. Accordingly, an input torque is transferred from the radial center to the external side. The lock member 4 has the second teeth 4b, which are engaged with the first teeth 2b of the first member 2 at a position radially external to the drive member 6. Thus, the lock member 4 and the first member 2 are mutually engaged with a relatively large torque. Accordingly, the respective members 4 to 6 are radially aligned without having radially crossing portions, and thus the lock member 4 and the first member 2 are engaged with a large torque. Thereby, the angle adjustment apparatus 1 can be configured simply, compared with a conventional configuration.

The biasing member 7 is provided between the second member 3 and the lock member 4, as shown in FIGS. 3 and 4, the biasing member 7 biasing the lock member 4 against the first member 2. Thus, the teeth 4b of the lock member 4 are engaged with the teeth 2b of the first member 2 by a biasing force of the biasing member 7.

The hole 4e is provided at the axial center of the lock member 4, as shown in FIGS. 3 and 4. The drive member 6 has the main body 6a and the first projection 6b, the main body 6a being inserted to the hole 4e of the lock member 4, and being axially movable and regulated from being axially rotated relative to the hole 4e, the first projection 6b projecting from the main body 6a between the lock member 4 and the first member 2. Thus, when the drive member 6 is moved from the first member 2 to the second member 3, the drive member 6 pushes the lock member 4 against the biasing force of the biasing member 7, and disengages the lock member 4 from the first teeth 2b of the first member 2.

When the drive member 6 is moved from the second member 3 to the first member 2, meanwhile, the lock member 4 is engaged with the first teeth 2b of the first member 2 by the biasing force of the biasing member 7. Further, the drive member 6 is axially moved relative to the lock member 4, even after the lock member 4 is engaged with the first member 2. Thus, the drive member 6 is prevented from excessively pushing the lock member 4 against the first member 2.

The input member 5 has the second projection 5c axially projecting from the second member 3 and mounted with the lever 14, as shown in FIG. 5. Thus, rotating the lever 14 mounted to the input member 5 exerts an input torque on the input member 5.

The first engagement portion 5d, 5e, and the second engagement portion 6d, 6e extending axially and circumferentially are threads, as shown in FIG. 5. Thus, the first engagement portion 5d, 5e, and the second engagement portion 6d, 6e are formed relatively easily.

The angle adjustment apparatus 1 has the mount member 8 regulating the first member 2 and the second member 3 from being axially disengaged, as shown in FIG. 5. Thus, the first member 2 and the second member 3 are not axially disengaged by the mount member 8, and are mutually rotatably held in the axial direction.

The angle adjustment apparatus 1 has the projection pin 2e provided to the first member 2 and the elongated groove 4f provided to the lock member 4, as shown in FIG. 3. Thus, the first member 2 and the second member 3 are not locked in a predetermined rotation angle range, regardless of the movement mechanism 15.

Figure 7:
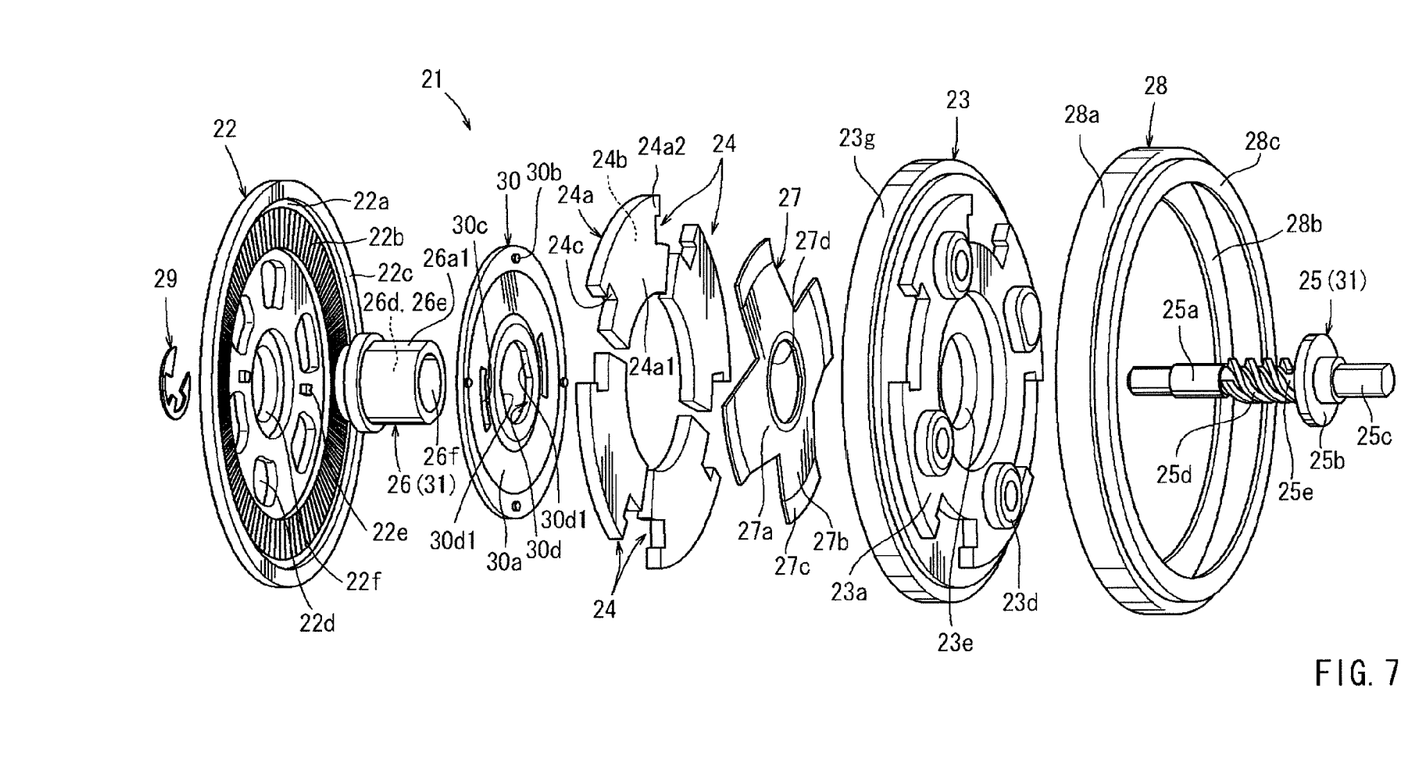
FIG. 7 is an exploded perspective view of an angle adjustment apparatus according to an alternative embodiment.
Figure 8:
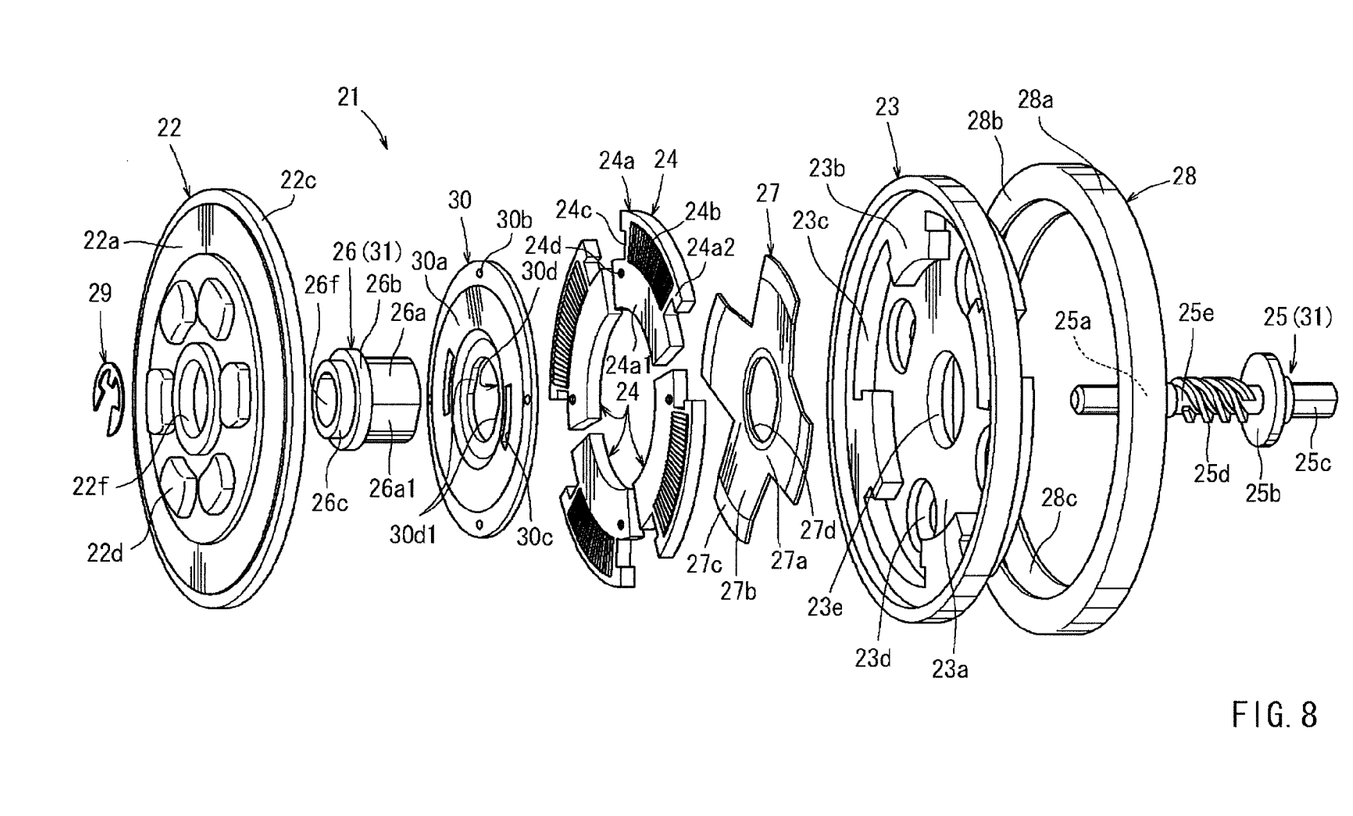
FIG. 8 is an exploded perspective view of the angle adjustment apparatus according to the alternative embodiment.

The present invention is not limited to the above-described embodiment. The present invention may also be an angle adjustment apparatus 21, as shown in FIGS. 7 to 10. The angle adjustment apparatus 21 has a first member 22, a second member 23, and a plurality of lock members 24, as shown in FIGS. 7 and 8.

The first member 22 has a similar configuration to the first member 2 of FIGS. 3 and 4. As shown in FIGS. 7 and 8, the first member 22 is integrally provided with a main body 22a and a flange 22c. The main body 22a is provided with teeth 22b, an attachment portion 22d, a projection pin 22e, and a hole 22f.

The second member 23 has a similar configuration to the second member 3 of FIGS. 3 and 4. As shown in FIGS. 7 and 8, the second member 23 is integrally provided with a main body 23a and a flange 23g. The main body 23a is provided with a projection 23d and a hole 23e. Rotation regulation portions 23b and recesses 23c are alternately provided on an internal periphery of the flange 23g.

Each of the lock member 24 has a fan-shaped main body 24a, as shown in FIGS. 7 and 8. An external peripheral portion 24a2 of the main body 24a is provided to the recess 23c of the second member 23. Recess-shaped rotation regulation portions 24c are provided to both end portions of the main body 24a. The rotation regulation portions 24c are engaged with the rotation regulation portions 23b of the second member 23. Thus, the lock members 24 are regulated from being rotated relative to the second member 23. A plurality of teeth 24b are provided to the external peripheral portion 24a2, the teeth 24b being engaged with the teeth 22b of the first member 22. A recess 24d is provided to an internal peripheral portion 24a1 of the main body 24a on a surface facing a release plate 30.

Figure 9:
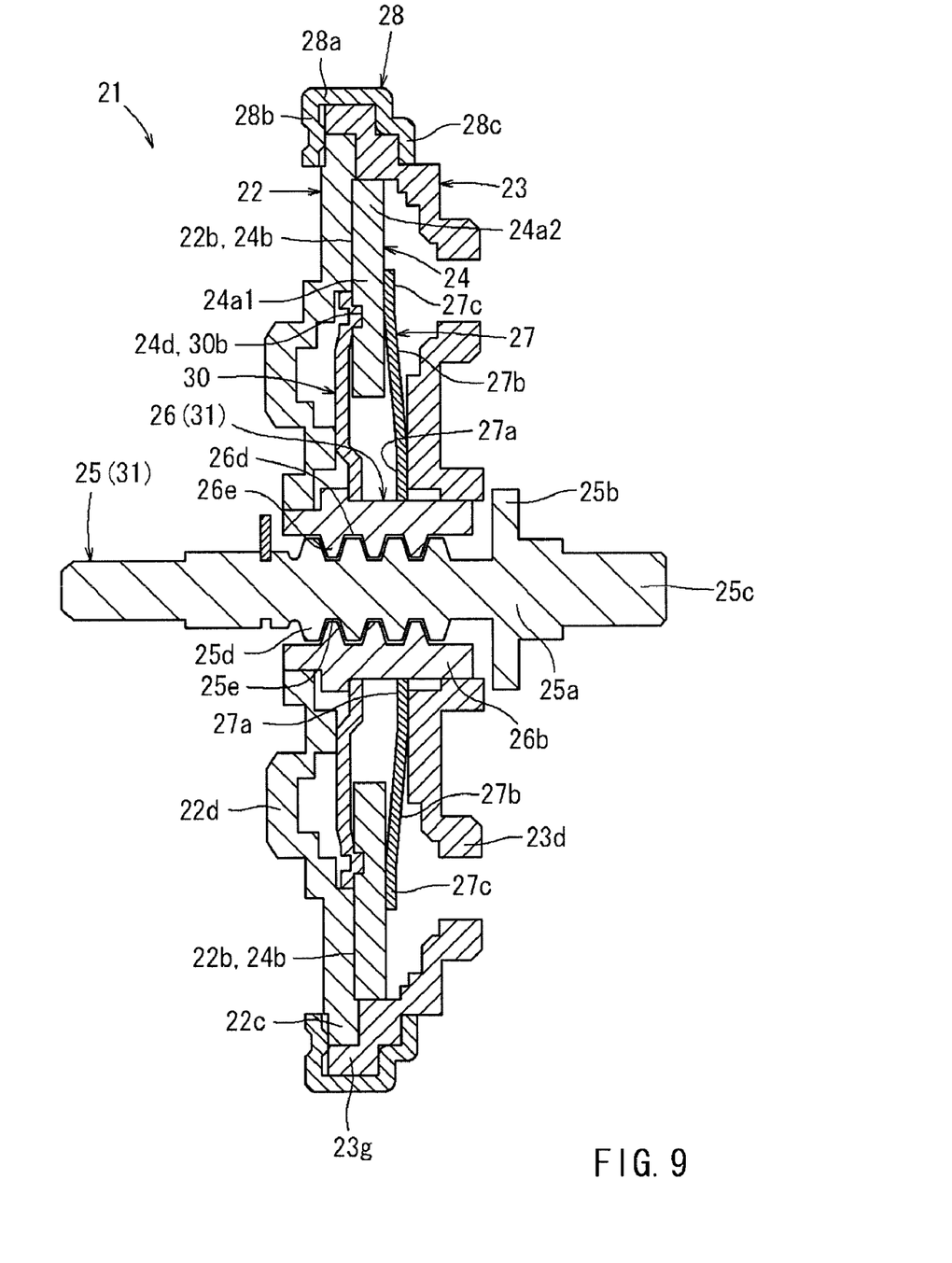
FIG. 9 is a cross-sectional view of the angle adjustment apparatus according to the alternative embodiment.

As shown in FIGS. 7 and 9, the release plate 30 is provided between the first member 22 and the lock members 24. The release plate 30 has a main body 30a having a disk shape. The main body 30a is provided opposite to the internal peripheral portion 24a1 of the main body 24a of the lock member 24. Thus, the release plate 30 can axially push the lock member 24 toward the second member 23. The main body 30a is provided with a projection 30b, an elongated groove 30c, and a hole 30d. The projection 30b is inserted to the recess 24d of the lock member 24, and thus limits rotation of the release plate 30 relative to the lock member 24.

The elongated groove 30c is provided extending in an arc shape, as shown in FIGS. 7 and 8. The projection pin 22e of the first member 22 is inserted to the elongated groove 30c. When the projection pin 22e is inserted to the elongated groove 30c, the teeth 24b of the lock member 24 are allowed to be engaged with the teeth 22b of the first member 22. When the projection pin 22e is not inserted to the elongated groove 30c, the projection pin 22e is contacted with the main body 30a of the release plate 30, and thus the teeth 24b and the teeth 22b are prevented from being engaged (free zone).

As shown in FIGS. 7 and 8, a biasing member 27 is provided between the lock members 24 and the second member 23. The biasing member 27 is a plate spring having a main body 27a and a plurality of extensions 27b. The main body 27a has a ring shape, and is provided with a hole 27d at the center. The extensions 27b are provided extending radially and axially from the main body 27a toward the lock members 24. End portions of the extensions 27b are provided with contacts 27c contacting the lock members 24. The main body 27a is contacted with the second member 23 and the extensions 27b are elastically deformed, and thereby the biasing member 27 biases the lock members 24 against the first member 22.

As shown in FIGS. 7 and 8, the angle adjustment apparatus 21 has a mount member 28 and a movement mechanism 31. The mount member 28 has a similar configuration to the mount member 8 of FIGS. 3 and 4. The mount member 28 is integrally provided with a ring main body 28a, a first overhang 28b, and a second overhang 28c.

The movement mechanism 31 has an input member 25 and a drive member 26, as shown in FIG. 7. The drive member 26 has a similar configuration to the drive member 6 of FIG. 3. The drive member 26 is integrally provided with a main body 26a, an end portion 26c, and a projection 26b, as shown in FIGS. 7 and 9.

A rotation regulation surface 26a1 is provided to an external peripheral surface of the main body 26a, as shown in FIGS. 7 and 9. When the main body 26a is inserted to the hole 30d of the release plate 30, the rotation regulation surface 26a1 faces a rotation regulation portion 30d1 provided to the hole 30d. Thus, the lock members 24 are regulated from being axially rotated relative to the release plate 30, and are allowed to be axially moved. The projection 26b is provided projecting radially externally from the main body 26a, and projecting between the first member 22 and the release plate 30. An engagement portion 26d, 26e (female thread) is provided to an internal peripheral surface of the main body 26a of the drive member 26.

The input member 25 has a similar configuration to the input member 5 of FIG. 3. The input member 25 is integrally provided with a main body 25a, a projection 25c, and a flange 25b, as shown in FIGS. 7 and 8. An engagement portion 25d, 25e (male thread) is provided to an external peripheral surface of the main body 25a. The main body 25a passes through the drive member 26, and an attachment member 29 is mounted to an end portion of the main body 25a.

Figure 10:
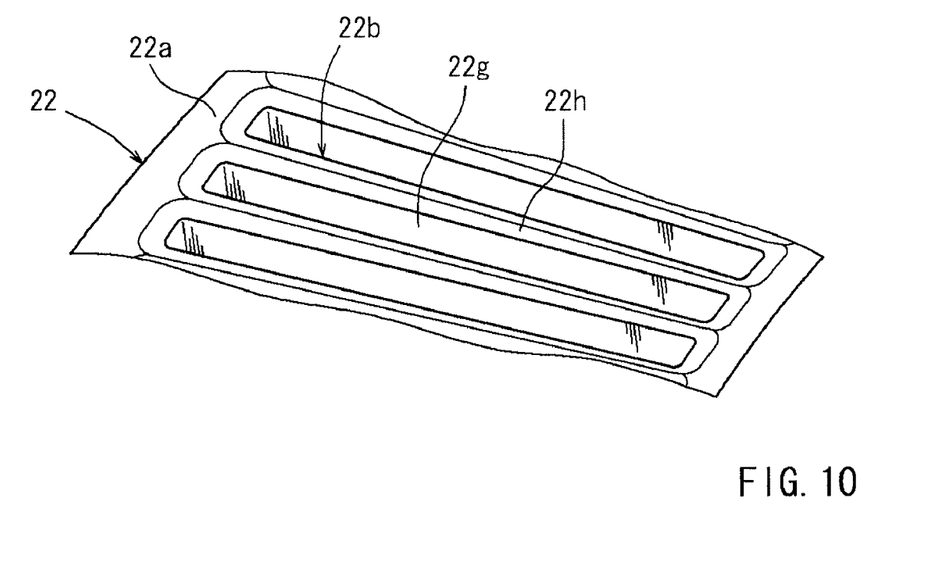
FIG. 10 is a partially enlarged perspective view of a first member according to the alternative embodiment.

The first member 22 is provided with a plurality of grooves 22g having a predetermined distance in between in the circumferential direction, as shown in FIG. 10. The teeth 22b are provided between the grooves 22g. A chamfer 22h is provided to an external periphery of an opening of each of the grooves 22g, the chamber 22h being inclined in a thickness direction from the main body 22a to the groove 22g. The chambers 22h thus allow easy insertion of the teeth 24b of the lock members 24 to the grooves 22g.

When the angle adjustment apparatus 21 is in the locked state, as shown in FIG. 9, the biasing member 27 biases the lock members 24 against the first member 22. Thereby, the teeth 24b of the lock members 24 are engaged with the teeth 22b of the first member 22.

When the angle adjustment apparatus 21 is unlocked from the locked state, the input member 25 is axially rotated. Thereby, the drive member 26 is axially moved relative to the input member 25, and then the drive member 26 pushes the release plate 30 toward the second member 23. The release plate 30 pushes the lock members 24 against the biasing force of the biasing member 27, and thus the teeth 24b of the lock members 24 are disengaged from the teeth 22b of the first member 22.

As described above, the angle adjustment apparatus 21 has the plurality of lock members 24, which are provided having a predetermined distance in between around the rotation center, as shown in FIGS. 7 and 8. Thus, each of the lock members 24 is engaged with the teeth 22b of the first member 22, without being regulated by the remaining lock members 24. In a case in which a ring-shaped lock member is provided with a plurality of teeth along an entire periphery, for instance, the entire lock member is not engaged with the first member when one of the teeth can not be engaged with the teeth of the first member. According to the present embodiment, however, each of the lock members 24 is surely engaged with the teeth 22b of the first member 22, without being affected by the remaining lock members 24.

The biasing member 27 is provided between the second member 23 an the lock members 24, as shown in FIGS. 7 and 9, the biasing member 27 biasing the lock members 24 against the first member 22. The biasing member 27 is a plate spring having the main body 27a and the plurality of extensions 27b, the main body 27a being provided with the hole 27d to which the input member 25 is inserted, the plurality of extensions 27b extending radially and axially from the main body 27a toward the lock members 24.

Thus, the biasing member 27, which is the plate spring, is thin, and can be thinner than a coil spring and the like. Accordingly, an axial length of the angle adjustment apparatus 21 can be short. The biasing member 27, which has the hole 27d to which the input member 25 is inserted, can be easily mounted to the input member 25 and the like. Each of the lock members 24, which is biased by each of the extensions 27b of the biasing member 27, can be biased by the biasing member 27 without being interfered by the remaining lock members 24.

The first teeth 22b are provided between the plurality of grooves 22g provided to the main body 22a of the first member 22, as shown in FIG. 10. The chamfers 22h are provided to the external peripheries of the grooves 22g. Thus, the chamfers 22h allow easy insertion of the second teeth 24b to the grooves 22g, thus ensuring engagement of the second teeth 24b and the first teeth 22b.

Alternative Embodiments

The present invention is not limited to the above-described embodiments, but may be embodied in forms below. For instance, the first seat member 11a of FIG. 1 is a back frame, and the second seat member 12a is a cushion frame. However, the first seat member may be a cushion frame, and the second seat member may be a back frame. Alternatively, one of the first seat member and the second seat member may be a seat back, and the other member may be an arm rest, a table, or the like. Alternatively, one of the first seat member and the second seat member may be a seat cushion, and the other member may be a foot rest to support occupant's calves, and the like.

The drive member 6 of FIG. 3 is provided separately from the lock member 4. The drive member, however, may be integrally provided with the lock member. The projecting spiral 6e of the drive member 6 of FIG. 5 is provided extending axially and circumferentially. The projecting spiral of the drive member, however, may have a radially projected pin and the like.

The projecting spiral 5d of the input member 5 of FIG. 5 is provided extending axially and circumferentially. The projecting spiral of the input member, however, may have a radially projected pin shape and the like. The input member 5 of FIG. 5 has the projection 5c axially projecting from the second member 3. The input member, however, may have a projection axially projecting from the first member, and a lever may be attached to the projection. The input member 5 of FIG. 5 is regulated from being axially moved relative to the first member 2 and the second member 3. The input member, however, may be regulated from being axially moved relative to either of the first member or the second member.

The biasing member 7 of FIG. 3 is a coil spring, but may be a rubber. The biasing member 7 of FIG. 3 is provided between the lock member 4 and the second member 3. The biasing member, however, may be provided between the lock member and the second member, so as to bias the lock member against the first member. The angle adjustment apparatus 1 of FIG. 3 has the biasing member 7. The angle adjustment apparatus, however, may have no biasing member 7, and the drive member may be regulated from being moved relative to the lock member in both axial directions. Thereby, the lock member moves in both axial directions concurrently with the drive member.

The angle adjustment apparatus 1 of FIG. 3 has the projection pin 2e provided to the first member 2, and the elongated groove 4f provided to the lock member 4. The angle adjustment apparatus, however, may have a projection pin provided to the lock member, and an elongated groove provided to the first member. The vehicle seat 10 of FIG. 1 is mounted to a vehicle, such as an automobile, but may also be mounted to a boat, an airplane, and the like.

In the alternative embodiments, the lock member may be provided with teeth provided between a plurality of grooves provided to a main body, and with chamfers to external peripheries of the grooves, similar to the first member 22 of FIG. 10.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An angle adjustment apparatus for a vehicle seat, the apparatus angle-adjustably connecting a first seat member and a second seat member of the vehicle seat, the apparatus comprising:
   a first member attached to the first seat member;
   a second member attached to the second seat member and rotatably mounted to the first member;
   a lock member axially movably provided between the first member and the second member;
   a movement mechanism axially moving the lock member relative to the first member; and
   a mount member regulating the first member and the second member from being axially disengaged, the mount member comprising:
      a ring main body covering external peripheral surfaces of the first member and the second member;
      a first overhang projecting from the ring main body toward the first member, and regulating the first member from being disengaged from the second member; and
      a second overhang projectin from the ring main body toward the second member, and regulating the second member from being disengaged from the first member, wherein
   the first member has first teeth on a surface facing the lock member,
   the lock member has second teeth and a rotation regulation portion, the second teeth being engagable with the first teeth at a position radially external to a rotation center of the first member and the second member, the rotation regulation portion being engaged with the second member and regulating the lock member from being axially rotated relative to the second member,
   the movement mechanism has an input member and a drive member,
   the input member being provided at the rotation center of the first member and the second member, and being regulated from being axially moved relative to one of the first member and the second member,
   the drive member being provided between an external peripheral surface of the input member and the lock member, and being regulated from being axially moved relative to the lock member,
   a first engagement portion is provided to the external peripheral surface of the input member,
   a second engagement portion engaged with the first engagement portion is provided to the drive member, and
   at least one of the first engagement portion and the second engagement portion extends axially and circumferentially from one of the external peripheral surface of the input member and the drive member, respectively.

2. The angle adjustment apparatus for a vehicle seat according to claim 1, further comprising:
   a biasing member provided between the second member and the lock member, the biasing member biasing the lock member against the first member.

3. The angle adjustment apparatus for a vehicle seat according to claim 2, wherein
   the lock member is provided with a hole at an axial center thereof, and
   the drive member has a main body and a first projection, the main body being inserted to the hole of the lock member, and being axially movable and being regulated from being axially rotated relative to the hole, and the first projection projecting from the main body and projecting between the lock member and the first member.

4. The angle adjustment apparatus for a vehicle seat according to claim 1, wherein the input member has a second projection axially projecting from one of the first member and the second member, and being mounted with a lever.

5. The angle adjustment apparatus for a vehicle seat according to claim 1, wherein one of the first engagement portion and the second engagement portion extending axially and circumferentially is a thread.

6. The angle adjustment apparatus for a vehicle seat according to claim 1, further comprising:
   a projection pin regulating the first teeth of the first member and the second teeth of the lock member from being engaged by projecting from one of the first member and the lock member toward the other of the members, and thus contacting the other of the members; and
   an elongated groove being provided to the other of the members, and allowing engagement of the teeth of the first member and the teeth of the lock member when the projection pin is inserted.

7. The angle adjustment apparatus for a vehicle seat according to claim 1, wherein the lock member comprises a plurality of lock members; and the plurality of lock members are provided having a predetermined distance in between around the rotation center.

8. The angle adjustment apparatus for a vehicle seat according to claim 7, further comprising:
   a biasing member provided between the second member and the lock members, the biasing member biasing the lock members against the first member, wherein the biasing member is a plate spring and comprises:
      a main body provided with a hole to which the input member is inserted; and
      a plurality of extensions extending radially and axially from the main body toward the lock members.

9. The angle adjustment apparatus for a vehicle seat according to claim 1, wherein the first teeth are provided between a plurality of grooves provided to a main body of the first member; and chamfers are provided to external peripheries of the grooves.

* * * * *

UNITED STATES PATENT AND TRADEMARK OFFICE
CERTIFICATE OF CORRECTION

PATENT NO. : 8,366,197 B2
APPLICATION NO. : 12/815628
DATED : February 5, 2013
INVENTOR(S) : Macit Aktas It is certified that error appears in the above-identified patent and that said Letters Patent is hereby corrected as shown below:

In the Claims:

At column 11, line 48 (claim 1, line 21) of the printed patent, please change "projectin" to -- projecting --.

Signed and Sealed this
Second Day of July, 2013

Teresa Stanek Rea
*Acting Director of the United States Patent and Trademark Office*